No. 766,303. Patented August 2, 1904.

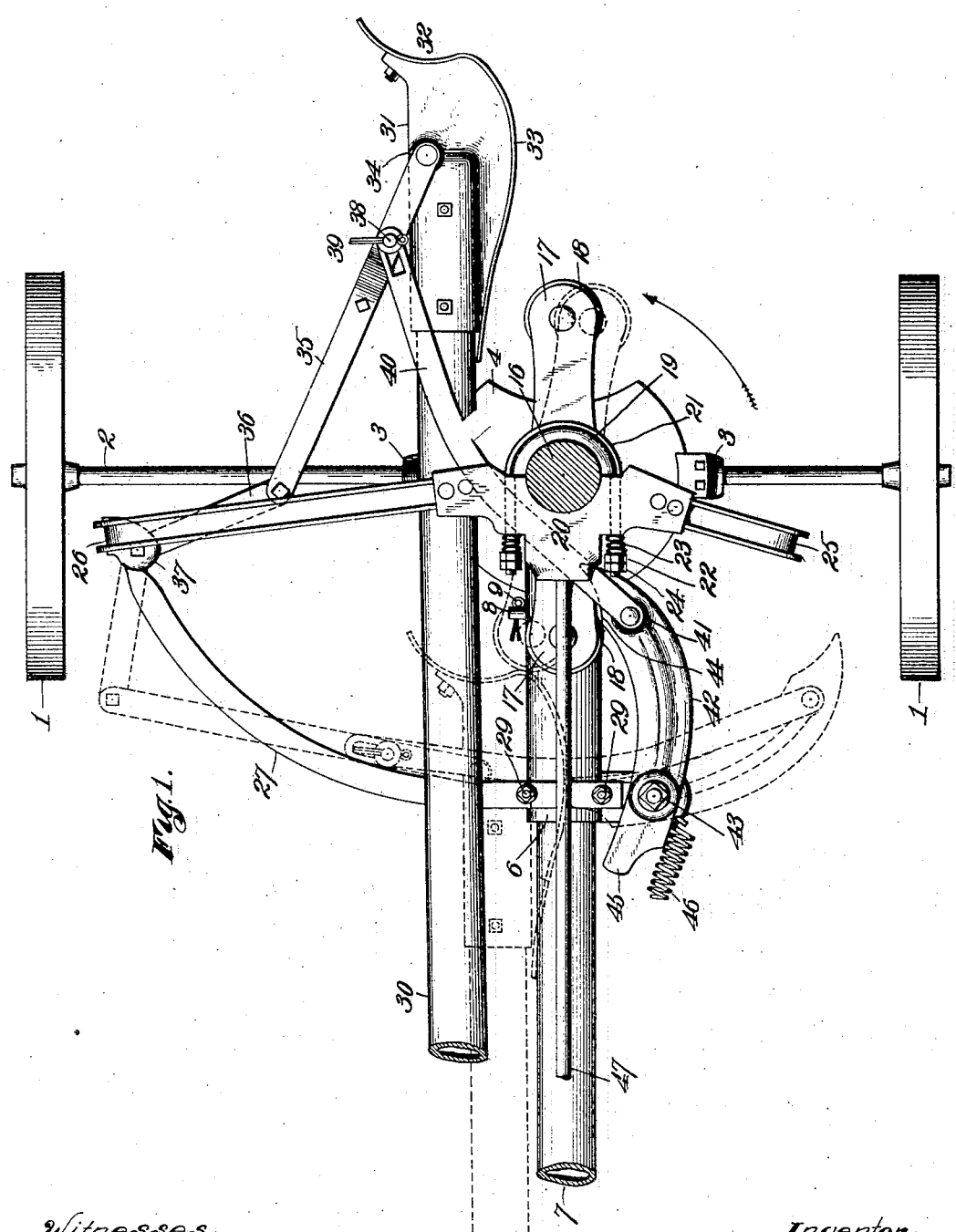

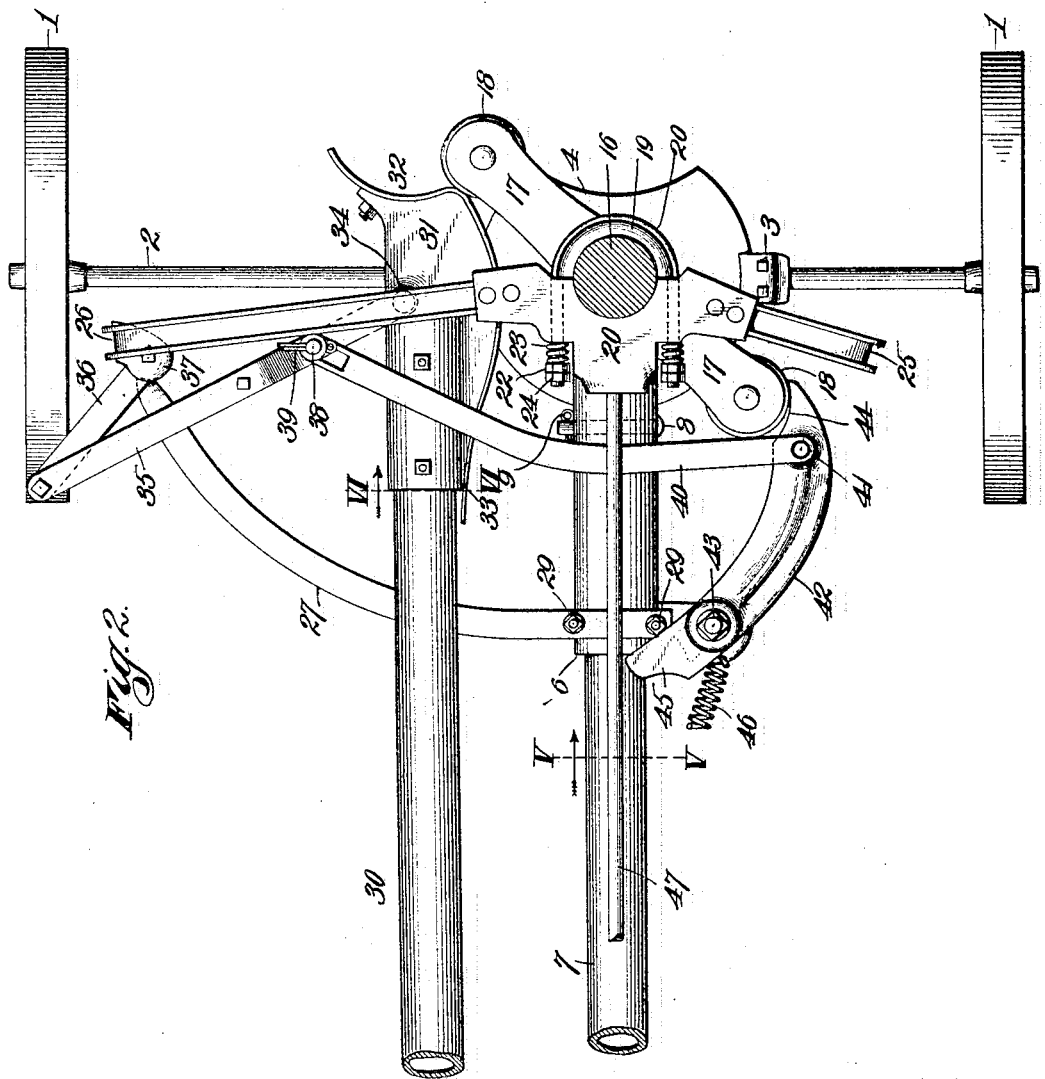

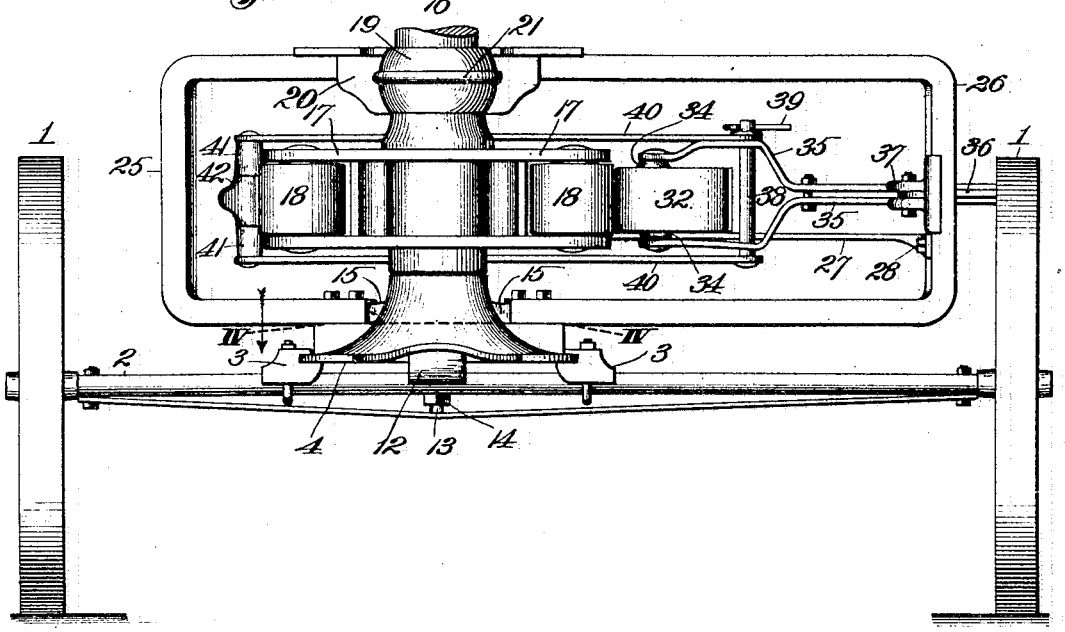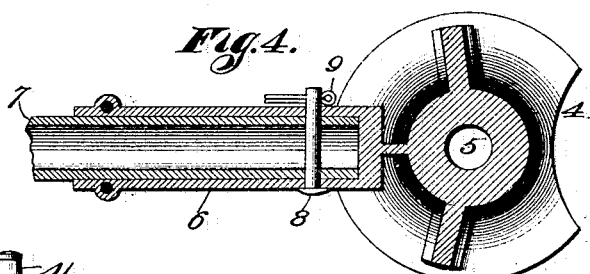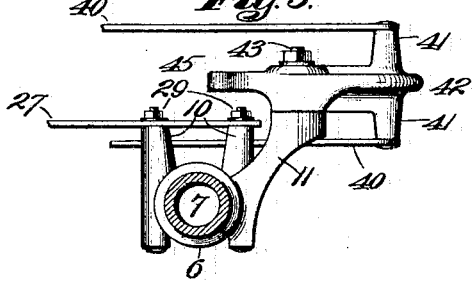

UNITED STATES PATENT OFFICE.

RALIEGH P. WHITE, OF KANSAS CITY, MISSOURI.

BALING-PRESS.

SPECIFICATION forming part of Letters Patent No. 766,303, dated August 2, 1904.

Application filed March 14, 1904. Serial No. 197,971. (No model.)

*To all whom it may concern:*

Be it known that I, RALIEGH P. WHITE, a citizen of the United States, residing at Kansas City, in the county of Jackson and State of Missouri, have invented certain new and useful Improvements in Baling-Presses, of which the following is a specification.

This invention relates to baling-presses, and more especially to that class having a plunger-beam operated successively by the trip-lever arms of the rotating power-shaft, my special object in this connection being to produce a machine in which a long plunger-stroke is obtained in order to permit of the use of a larger feed-opening, and therefore increase the capacity of the machine by enabling the feeder to place hay in the hopper in larger bunches than heretofore.

With this general object in view the invention consists in certain novel and peculiar features of construction and combinations of parts, as hereinafter described and claimed, and in order that the invention may be fully understood reference is to be had to the accompanying drawings, in which—

Figure 1 is a horizontal section of the power end of a baling-press embodying my invention and with the parts disposed in full lines in their initial positions and in dotted lines in the positions which they have assumed at the completion of the power-stroke. Fig. 2 is a similar section with the parts in the position they have assumed when the power-stroke is about half completed. Fig. 3 is a front view with the parts in the position shown in Fig. 2. Fig. 4 is a horizontal section on the line IV IV of Fig. 3. Fig. 5 is a cross-section on the line V V of Fig. 2. Fig. 6 is a cross-section on the line VI VI of Fig. 2.

Referring now to the drawings in detail, where like reference-numerals designate corresponding parts, 1 designates the wheels, and 2 the axle, of the power end of a press.

3 represents grooved blocks bolted upon the axle, and 4 a circular base-casting supported in the grooved blocks 3 and disposed to one side of the center of the axle. This base-casting is provided with a central hole 5 and with a rearwardly-projecting sleeve portion 6 to receive the front end of the reach 7, the latter being secured in the sleeve by the cross-pin 8 and the spring-cotter 9. Sleeve portion 6 at its rear end is provided with vertical bosses 10 and with a rearwardly and upwardly projecting boss 11. The base-casting is further secured upon the axle by the depending portion 12, provided with a bolt-stem 13, extending through the axle and engaged at the lower side of the latter by a nut 14, and the base-casting is furthermore provided with the lugs 15.

The power-shaft 16, provided with the usual sweep (not shown) at its upper end and also provided with the customary trip-lever composed of diametrically opposite arms 17, equipped with antifriction-rolls 18, is step-journaled in the base-casting and is also journaled in a bearing composed of members 19 and 20, secured together by the U-bolt 21, and nuts 22, engaging the U-bolt, the latter being also equipped, as usual, with the cushion-springs 23 between bearing member 20 and said nuts and with lock-nuts 24.

Member 20 and base-casting 4, in conjunction with U-shaped channel-bars 25 and 26, secured to said member and the base-casting, as shown, constitute a rigid bearing-frame for the power-shaft, said bearing-frame being stiffened by the horizontal bar 27, bolted, as at 28, to frame portion 26 and, as at 29, to bosses 10, said bar forming a guide and support for the plunger-beam 30, said beam being adapted to be connected to the usual plunger (not shown) for operation in the customary baling-case connected to the power end of the machine by reach 7 in the usual or any preferred manner. (Not shown.)

31 designates the cast head of the plunger-beam, the same being so mounted upon the plunger-beam that its lower side will be flush with the lower side of the beam proper in order that it may slide freely over and beyond the guide-bar 27 when the compression-stroke is made. The head is provided with the usual pocket 32 at its front end and at such end and at its inner side is equipped with the usual wear-plate 33. It is, furthermore, provided with the vertical bosses 34, pivotally connected by links 35 with one end of the swing-link 36, pivotally connected at its opposite end for operation in a horizontal plane to the bifurcated casing 37, secured to the vertical part of frame portion 26.

38 is a pivot-pin extending through links 35 at a suitable point and held in place by cotter 39 or its equivalent, said pin also extending pivotally through the slotted end of a pair of links 40, pivoted at their opposite ends to bosses 41 of a swing-lever 42, pivotally mounted upon bolt 43, carried by boss 11, and said swing-lever is provided at its inner side and front end with a concave trackway 44 and at its rear end with a heel 45. A retractile spring 46 for withdrawing the plunger-beam after its compression-stroke is made is attached to swing-lever 42, and the bearing-frame for the power-shaft is also braced in the customary manner by the tie-rod 47.

As the sweep (not shown) is moved by the horses in the direction indicated by the arrow, Fig. 1, the roll of the at that time rearwardly-projecting trip-lever arm engages the front end of the swing-lever 42 and swings the same outwardly, this action through the medium of links 40 drawing the plunger-beam rearwardly with greater rapidity and a greater distance than would be the case if said links were directly pivoted to the plunger-beam, this increased rapidity and length of stroke being due to the fact of the additional leverage obtained on the plunger-beam by connecting said links with the link 35 outward of the point of connection of the latter with the plunger-beam, and, furthermore, because said link 35 is attached to the swing-link 36. As a result of this increased plunger movement it is practical to provide the baling-chamber with a larger feed-opening, and thus enable the feeder to deposit hay in larger bunches in the hopper to produce a regular-sized bale with fewer strokes of the plunger.

By the time the hay is about condensed in the baling-case the parts have assumed the position shown in Fig. 2, and the first-named trip-arm roll is about to release the swing-lever 42, and the other trip-arm is applying endwise pressure on the beam and is about to enter the pocket 32 thereof in order to impose a direct application of power for the remaining or real compressson portion of the stroke.

By the time the half-circle of the sweep has been completed the parts are disposed approximately as shown in Fig. 1, where the dotted lines show that the heel portion 45 of the swing-lever 42 acts as an abutment to arrest the lateral movement of the plunger-beam and trip the same from the continually-moving trip-lever, the spring 46 insuring the rebound of the plunger-beam to the position shown in full lines, said figure, as soon as the said disengagement has been effected. This return of the beam through the connections described incidentally moves the swing-lever from the position shown in dotted to the position shown in full lines, said figure, where it is almost instantly engaged by the second trip-lever roll, and as a result the second compression-stroke of the plunger is begun.

From the above description it will be apparent that I have produced a baling-press embodying the features of advantage enumerated as desirable and which is obviously susceptible of modification in various particulars without departing from the essential spirit and scope or sacrificing any of its advantages.

Having thus described the invention, what I claim as new, and desire to secure by Letters Patent of the United States, is—

1. A baling-press, comprising a power-shaft provided with trip-arms, a plunger-beam, a swing-lever adapted to be successively operated by the trip-arms, a link suitably carried and pivoted to the plunger-beam, and a link connecting the swing-lever with said link at the opposite side of the plunger-beam from the power-shaft.

2. A baling-press, comprising a power-shaft provided with trip-arms, a plunger-beam, a swing-lever adapted to be successively operated by the trip-arms, a swing-link, a link pivotally connecting said swing-link with the plunger-beam, and a link pivotally connecting the last-named link with the swing-lever.

3. A baling-press, comprising a power-shaft having trip-arms, a plunger-beam, a link suitably carried and pivoted to the plunger-beam, a swing-lever to be successively operated by the trip-arms and provided with a heel portion as a trip-off abutment for the plunger-beam at the end of its power-stroke, and a link pivotally connecting the front portion of said lever with the first-named link outward of the pivotal point of connection of the latter with the plunger-beam.

4. A baling-press, comprising a power-shaft having trip-arms, a suitable bearing-frame for said shaft, a plunger-beam, a swing-link mounted on said frame, a link pivotally connecting said swing-link with the plunger-beam, a swing-lever suitably mounted, a link pivotally connecting the swing-lever with the link connected to the plunger-beam but outward of the point of connection of said link with the plunger-beam, and an abutment or stop to arrest the lateral movement of the plunger-beam when its compression-stroke is ended.

5. A baling-press, comprising a power-shaft having trip-arms, a suitable bearing-frame for said shaft, a plunger-beam, a swing-link mounted on said frame, a link pivotally connecting said swing-link with the plunger-beam, a swing-lever suitably mounted, a link pivotally connecting the swing-lever with the link connected to the plunger-beam but outward of the point of connection of said link with the plunger-beam, an abutment or stop to arrest the lateral movement of the plunger-beam when its compression-stroke is ended, and a bar to brace said frame and support the plunger-beam in the plane of the trip-arms.

In testimony whereof I affix my signature in the presence of two witnesses.

RALIEGH P. WHITE.

Witnesses:
H. C. RODGERS,
G. Y. THORPE.